US007895138B2

(12) United States Patent
Schobben et al.

(10) Patent No.: US 7,895,138 B2
(45) Date of Patent: Feb. 22, 2011

(54) DEVICE AND A METHOD TO PROCESS AUDIO DATA, A COMPUTER PROGRAM ELEMENT AND COMPUTER-READABLE MEDIUM

(75) Inventors: Daniel Willem Schobben, Waarle (NL); Machiel Willem Loon, Veldhoven (NL); Martin Franciscus McKinney, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 944 days.

(21) Appl. No.: 11/719,560

(22) PCT Filed: Nov. 16, 2005

(86) PCT No.: PCT/IB2005/053780

§ 371 (c)(1),
(2), (4) Date: May 17, 2007

(87) PCT Pub. No.: WO2006/056910

PCT Pub. Date: Jun. 1, 2006

(65) Prior Publication Data

US 2009/0157575 A1 Jun. 18, 2009

(30) Foreign Application Priority Data

Nov. 23, 2004 (EP) .................................. 04106009

(51) Int. Cl.
*G06F 15/18* (2006.01)
*G06E 3/00* (2006.01)

(52) U.S. Cl. .............................. 706/14; 706/20; 706/52

(58) Field of Classification Search ....................... None
See application file for complete search history.

(56) References Cited

U.S. PATENT DOCUMENTS 6,044,343 A 3/2000 Cong et al.
6,198,827 B1 3/2001 Waller, Jr.
6,496,584 B2 12/2002 Irwan et al.

(Continued)

FOREIGN PATENT DOCUMENTS

EP 1260968 A1 11/2002

(Continued)

OTHER PUBLICATIONS

Chen et al., H. "A music recommendation system based on on music data grouping and user interests", CIKM, Nov. 5-10, 2001, p. 231-238.*

(Continued)

*Primary Examiner*—Michael B. Holmes
*Assistant Examiner*—Adrian L Kennedy

(57) ABSTRACT

An audio data processing device (100) comprises an audio redistributor (101) adapted to generate a first number of audio data output signals (102; $Z_1 \ldots Z_M$) based on a second number of audio data input signals (103; $X_1 \ldots X_N$), and an audio classifier (104) adapted to generate gradually sliding control signals (P), in a gradually sliding dependence on types of audio content according to which the second number of audio data input signals (103; $X_1 \ldots X_N$) are classified, for controlling the audio redistributor (101) that generates the first number of audio data output signals (102; $Z_1 \ldots Z_M$) from the second number of audio data input signals (103; $X_1 \ldots X_N$).

20 Claims, 3 Drawing Sheets

U.S. PATENT DOCUMENTS

| | | | | |
|---|---|---|---|---|
| 7,022,907 | B2 * | 4/2006 | Lu et al. | 84/611 |
| 2003/0040904 | A1 * | 2/2003 | Whitman et al. | 704/212 |
| 2003/0210794 | A1 | 11/2003 | Sato et al. | |
| 2004/0125960 | A1 | 7/2004 | Fosgate et al. | |

FOREIGN PATENT DOCUMENTS

| | | | |
|---|---|---|---|
| EP | 1387601 | A2 | 2/2004 |
| JP | 08037700 | | 2/1996 |

OTHER PUBLICATIONS

Pachet, F., "Content Management for Electronic Music Distribution", Communications of the ACM, Apr. 2003, p. 71-75.*

Gundry, Kenneth: "A New Active Matrix Decoder for Surround Sound"; in Proc. AES, 19th International Conference on Surround Sound, Jun. 2001.

Han et al: "Genre Classification System of TV Sound Signals Based on a Spectrogram Analysis"; IEEE Transactions on Consumer Electronics, vol. 44, No. 1, Feb. 1998.

Harb et al: "Mixture of Experts for Audio Classification: An Application to Male Female Classification and Musical Genre Recognition"; Multimedia and Expo, 2004. ICME 2004 IEEE Intl. Conference in Taipei, Taiwan, Jun. 27-30, 2004. IEEE, vol. 2, Jun. 27, 2004, pp. 1351-1354, XP010771167.

McKinney et al: "Features for Audio and Music Classification"; Online, 2003, 4th International Conference on Music Information Retrieval, XP002374912.

* cited by examiner

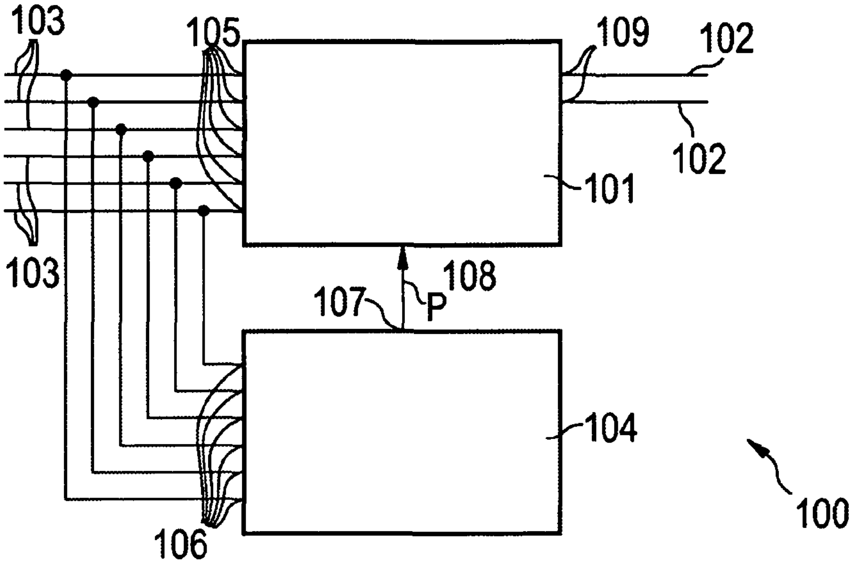
FIG 1
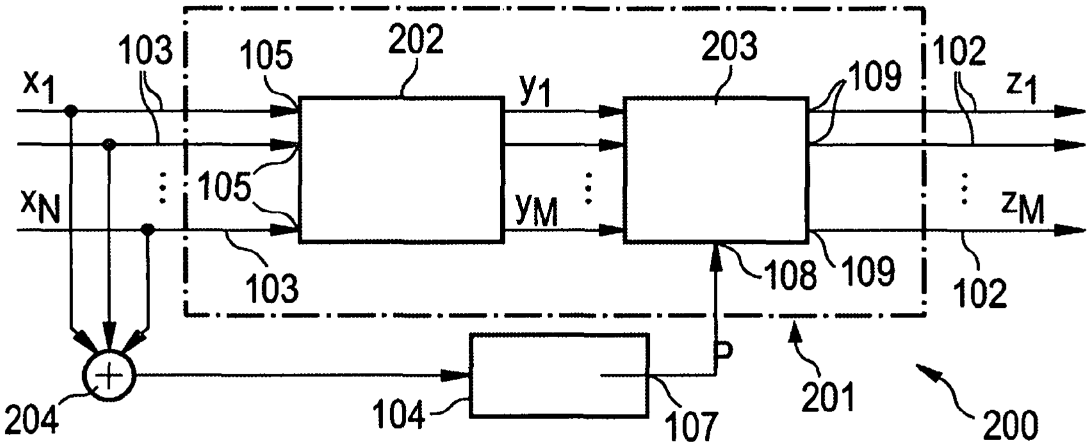
FIG 2A
$$\begin{bmatrix} L_f \\ R_f \\ C \\ L_s \\ R_s \\ LFE \end{bmatrix} = (1-P) \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} L_f \\ R_f \\ C \\ L_s \\ R_s \\ LFE \end{bmatrix} + P \begin{bmatrix} 1 & 0 & \frac{a}{\sqrt{2}} & 0 & 0 & 0 \\ 0 & 1 & \frac{a}{\sqrt{2}} & 0 & 0 & 0 \\ 0 & 0 & 1-a & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} L_f \\ R_f \\ C \\ L_s \\ R_s \\ LFE \end{bmatrix}$$
FIG 2B $$\begin{bmatrix} y_1 \\ y_2 \\ y_3 \\ \vdots \\ y_M \end{bmatrix} = \underbrace{\begin{bmatrix} f_{11}(P) & f_{12}(P) & f_{13}(P) & \cdots & f_{1N}(P) \\ f_{21}(P) & f_{22}(P) & f_{23}(P) & \cdots & f_{2N}(P) \\ f_{31}(P) & f_{32}(P) & f_{33}(P) & \cdots & f_{3N}(P) \\ \vdots & \vdots & \vdots & \vdots & \vdots \\ f_{M1}(P) & f_{M2}(P) & f_{M3}(P) & \cdots & f_{MN}(P) \end{bmatrix}}_{\overleftrightarrow{M}(P)} \begin{bmatrix} x_1 \\ x_2 \\ x_3 \\ \vdots \\ x_N \end{bmatrix}$$

$$\begin{bmatrix} y_1 \\ y_2 \\ y_3 \\ \vdots \\ y_M \end{bmatrix} = \underbrace{\begin{bmatrix} f_{11}(x_i) & f_{12}(x_i) & f_{13}(x_i) & \cdots & f_{1N}(x_i) \\ f_{21}(x_i) & f_{22}(x_i) & f_{23}(x_i) & \cdots & f_{2N}(x_i) \\ f_{31}(x_i) & f_{32}(x_i) & f_{33}(x_i) & \cdots & f_{3N}(x_i) \\ \vdots & \vdots & \vdots & \vdots & \vdots \\ f_{M1}(x_i) & f_{M2}(x_i) & f_{M3}(x_i) & \cdots & f_{MN}(x_i) \end{bmatrix}}_{\overleftrightarrow{M}(x_i)} \begin{bmatrix} x_1 \\ x_2 \\ x_3 \\ \vdots \\ x_N \end{bmatrix}$$

DEVICE AND A METHOD TO PROCESS AUDIO DATA, A COMPUTER PROGRAM ELEMENT AND COMPUTER-READABLE MEDIUM

FIELD OF THE INVENTION

The invention relates to an audio data processing device.

The invention further relates to a method of processing audio data.

Moreover, the invention relates to a program element.

Further, the invention relates to a computer-readable medium.

BACKGROUND OF THE INVENTION

Many audio recordings nowadays are available in stereo or in so-called 5.1-surround format. For playback of these recordings, two loudspeakers in the case of stereo, or six loudspeakers in the case of a 5.1-surround are necessary as well as a certain standard speaker set-up.

However, in many practical cases, the number of loudspeakers or the set-up does not meet the requirements to achieve a high quality audio playback. For that reason, audio redistribution systems have been developed. Such an audio redistribution system has a number of N input channels and a number of M output channels. Thus, three situations are possible:

In a first situation, M is greater than N. This means that more loudspeakers are used for playback than there are stored audio channels.

In a second situation, M is equal to N. In this case, equal numbers of input and output channels are present. However, the speaker set-up for playing back output is not in conformity to the data provided as an input, which requires redistribution.

According to a third scenario, M is smaller than N. In this case, more audio channels are available than playback channels.

An example of the first situation is the conversion from stereo to 5.1-surround. Known systems of this type are Dolby Pro Logic™ (see Gundry, Kenneth "A new active matrix decoder for surround sound", In Proc. AES, 19$^{th}$ International Conference on Surround Sound, June 2001) and Circle Surround™ (see U.S. Pat. No. 6,198,827: 5-2-5 matrix system). Another technique of this type is disclosed in U.S. Pat. No. 6,496,584.

An example of the second situation is the improvement of the wideness of the center speaker in a 5.1-system by adding the center signal to the left and right channel. This is done in the music mode of Dolby Pro Logic II™. Another example is stereo-widening, where a small speaker base is used (for example in television systems). Within the Philips™ company, a technique called Incredible Stereo™ has been developed for this purpose.

In the third situation, so-called down-mixing is applied. This down-mixing can be done in a smart way, to maintain the original spatial image as well as possible. An example of such a technique is Incredible Surround Sound™ from the Philips™ company, in which 5.1-surround audio is played back over two loudspeakers.

Two different approaches are known for the redistribution as mentioned in the examples above. First, redistribution may be based on a fixed matrix. Second, redistribution may be controlled by inter-channel characteristics such as, for example, correlation.

A technique like Incredible Stereo™ is an example of the first situation. A disadvantage of this approach is that certain audio signals, like speech signals, panned in the center are negatively affected, i.e. such that the quality of reproduced audio may be insufficient. To prevent such a deterioration of the audio quality, a new technique was developed, based on correlation between channels (see WO 03/049497 A2). This technique assumes that speech panned in the center, has a strong correlation between the left and the right channel.

Dolby Pro Logic II™ redistributes the input signals on the basis of inter-channel characteristics. Dolby Pro Logic II™, however, has two different modes, movie and music. Different redistributions are provided depending on which setting is chosen by the user. These different modes are available because different audio contents have different optimal settings. For example, for movie it is often desired to have speech in the center channel only, but for music it is not preferred to have vocals in the center channel only; here a phantom center source is preferred.

Thus, the discussed prior art concerning redistribution techniques suffers from the disadvantage that different settings are advantageous for different audio contents.

JP-08037700 discloses a sound field correction circuit having a music category discrimination part which specifies the music category of music signals. Based on the music category specified, a mode-setting micro-controller sets a corresponding simulation mode.

US 2003/0210794 A1 discloses a matrix surround decoding system having a microcomputer that determines a type of stereo source, an output of the microcomputer being input to a matrix surround decoder for switching the output mode of the matrix surround decoder to a mode corresponding to the type of stereophonic source thus determined.

According to JP-08037700 and US 2003/0210794 A1, however, the category of an audio content is estimated by a binary-type decision ("Yes" or "No"), i.e. a particular one from among a plurality of audio genres is considered to be present, even in a scenario in which an audio excerpt has elements from different music genres. This may result in a poor reproduction quality of audio data processed according to any of JP-08037700 and US 2003/0210794 A1.

OBJECT AND SUMMARY OF THE INVENTION

It is an object of the invention to provide an audio data processing with a higher degree of flexibility.

In order to achieve the object defined above, an audio data processing device, a method of processing audio data, a program element, and a computer-readable medium according to the independent claims are provided.

The audio data processing device comprises an audio redistributor adapted to generate a first number of audio data output signals based on a second number of audio data input signals. Furthermore, the audio data processing device comprises an audio classifier adapted to generate gradually sliding control signals for controlling the audio redistributors, which generates the first number of audio data output signals from the second number of audio data input signals, in a gradually sliding dependence on types of audio content according to which the second number of audio data input signals are classified.

Furthermore, the invention provides a method of processing audio data comprising the steps of redistributing audio data input signals by generating a first number of audio data output signals based on a second number of audio data input signals, and classifying the audio data input signals so as to generate, in a gradually sliding dependence on types of audio content according to which the audio data input signals are classified, gradually sliding control signals for controlling the redistribution for generating the first number of audio data output signals from the second number of audio data input signals.

Beyond this, a program element is provided which, when being executed by a processor, is adapted to carry out a method of processing audio data comprising the above-mentioned method steps.

Moreover, a computer-readable medium is provided in which a computer program is stored which, when being executed by a processor, is adapted to carry out a method of processing audio data having the above-mentioned method steps.

The audio processing according to the invention can be realized by a computer program, i.e. by software, or by using one or more special electronic optimization circuits, i.e. in hardware, or in a hybrid form, i.e. by means of software and hardware components.

The characteristic features of the invention particularly have the advantage that the audio redistribution according to the invention is significantly improved compared with the related art by eliminating an inaccurate binary-type "Yes"-"No" decision as, to which classification (for example "classical" music, "jazz", "pop", "speech", etc.) a particular audio excerpt should have. Instead, an audio redistributor is controlled by means of gradually sliding control signals, which gradually sliding control signals depend on a refined classification of audio data input signals. The devices and the method according to the invention do not summarily classify an audio excerpt into exactly one of a number of fixed types of audio content (for example genres) which fits best, but take into account different aspects and properties of audio signals, for example contributions of classical music characteristics and of popular music characteristics.

Thus, an audio excerpt may be classified into a plurality of different types of audio content (that is different audio classes), wherein weighting factors may define the quantitative contributions of each of the plurality of types of audio content. Thus, an audio excerpt can be prorated to a plurality of audio classes.

The control signals thus reflect two or more such contributions of different types of audio content and depend also on the extent to which audio signals belong to different types of content, for example to different audio genres. According to the invention, the control signals are continuously/infinitely variable so that a slight change in the properties of the audio input always results in a small change of the value(s) of the control signal(s).

In other words, the invention does not take a rude binary decision which particular content type or genre is assigned to the present audio data input signals. Instead, different characteristics of audio input signals are taken into account gradually in the control signals. Thus, a music excerpt which has contributions of "jazz" elements and of "pop" elements will not be treated as pure "jazz" music or as pure "pop" music but, depending on the degree of "pop" music element contributions and of "jazz" music element contributions, the control signal for controlling the audio redistributor will reflect both, the "jazz" and the "pop" music character of the input signals. Owing to this measure, the control signals will correspond to the character of incoming audio signals, so that an audio redistributor can accurately process these audio signals. The provision of gradually scaled control signals renders it possible to match the functionality of the audio redistributor to the detailed character of audio input data to be processed, which matching results in a better sensitivity of the control even to very small changes in the character of an audio signal. The measures according to the invention thus provide a very sensitive real-time classification of audio input data in which probabilities, percentages, weighting factors, or other parameters for characterizing a type of audio content are provided as control information to an audio redistributor, so that a redistribution of the audio data can be tailored to the type of audio data.

The classifier may automatically analyze audio input data (for example carry out a spectral analysis) to determine characteristic features of the present audio excerpt. Pre-determined (for example based on an engineer's know-how) or ad-hoc rules (for example expert rules) may be introduced into the audio classifier as a basis for a decision on how an audio excerpt is to be categorized, i.e. to which types of audio content (and in what relative proportions thereof) the audio excerpt is to be classified.

Since the character of a piece of audio can vary rapidly within a single excerpt, the gradually sliding control signals can be adjusted or updated continuously during transmission or flow of the audio data, so that changes in the character of the music result in changes in the control signals. The system according to the invention does not take a sharp selection decision on whether music has to be classified as genre A, as genre B, or as genre C. Instead, probability values are estimated according to the invention, which probability values reflect the extent to which the present audio data can be classified into a particular genre (for example "pop" music, "jazz" music, "classical" music, "speech", etc.). Thus, the control signal may be generated on a "pro rata" basis, wherein the different contributions are derived from different characteristics of the piece of audio.

Thus, the invention provides an audio redistribution system controlled by an audio classifier, wherein different audio contents yield different settings, so that the audio classifier optimizes an audio redistributor function in dependence on differences in audio content.

The redistribution is controlled by an audio classifier, for instance by an audio classifier as disclosed by McKinney, Martin, Breebaart, Jeroen, "Features for Audio and Music Classification", 4th International Conference on Music Information Retrieval, Izmir, 2003. Such a classifier may be trained (before and/or during use) by means of reference audio signals or audio data input signals to distinguish different classes of audio content. Such classes include, for example, "pop" music, "classical" music, "speech", etc. In other words, the classifier according to the invention determines the probability that an excerpt belongs to different classes.

Such a classifier is capable of implementing the redistribution such that it is an optimum for the type of content of the audio data input signals. This is different from the approach according to the related art, which is based on inter-channel characteristics and ad-hoc choices of the algorithm designer. These characteristics are examples of low-level features. The classifier according to the invention may determine these kinds of features as well, but it may be trained for a wide variety of contents, using these features to distinguish between classes.

One aspect of the invention is found in providing an audio redistributor having N input signals (which input signals may be compressed, like MP3 data), redistributing these input signals over M outputs, wherein the redistribution depends on an audio classifier that classifies the audio. This classification should be performed in a gradually sliding manner, so that an inaccurate and sometimes incorrect assignment to a particular type of content is avoided. Instead, control signals for controlling the redistributor are generated gradually, distinguishing between different characters of audio content. Such an audio classifier is a system that relies on relations between classes of audio (for example music, speech), which may be learnt in an auto-adaptive manner from content analysis.

The audio classifier according to the invention may be constructed for generating classification information P out of the N audio inputs, and the redistribution of those N audio inputs over M audio outputs is dependent on such a classification information P, wherein the classification information P may be a probability.

The audio redistributor according to the invention may be adapted to flexibly carry out a conversion such that M>N, M<N or M=N. The redistributor may be an active matrix system, and the redistributor may be an audio decoder. The invention may further be embodied as a retrofit element for use downstream of existing redistributors.

Exemplary applications of the invention relate, for example, to the upgrading of existing up-mix systems like Dolby Pro Logic™ and Circle Surround™. The system according to the invention can be added to an existing system to improve the audio data processing capability and functionality. Another application of the invention is related to new up-mix algorithms for use in combination with a picture screen. A further application relates to the improvement of existing down-mix systems like Incredible Surround Sound™. Beyond this, the invention may be implemented to improve existing stereo-widening algorithms.

Consequently, the audio redistribution can be done in such a way that it is an optimum for the present type of content.

An important aspect of the invention relates to the fact that the system's behavior can be time-dependent, because it can keep on optimizing itself, for example based on day-to-day contents and metadata (for example teletext). Also, different parts of an audio excerpt (for example different data frames) can be categorized separately for updating control signals in a time-dependent manner. An audio data processing device having such a function is an optimum for every user, and new content can be handled in an optimized manner.

Another important aspect of the invention is related to the fact that the system of the invention uses classes or types of audio content, each having a particular physical or psychoacoustic meaning or nature (such as a genre), for instance to control a channel up-converter. Such classes may include, for example, the discrimination between music and speech, or an even more refined discrimination, for instance between "pop" music, "classical" music, "jazz" music, "folklore" music, and so on.

One aspect of the invention is related to a multi-channel audio reproduction system performing a frame-wise or block-wise analysis. Control information for controlling an audio redistributor generated by an audio classifier is generated based on the content type. This allows an automatic, optimized and class-specific redistribution of audio, controlled by audio class/genre info.

Referring to the dependent claims, further preferred embodiments of the invention will be described in the following.

Next, preferred embodiments of the audio data processing device according to the invention will be described. These embodiments may also be used for the method of processing audio data, for the program element, and for the computer-readable medium.

The first number of audio data output signals and/or the second number of audio data input signals may be greater than one. In other words, the audio data processing device may carry out a multi-channel input and/or multi-channel output processing.

According to an embodiment, the first number may be greater or smaller than or equal to the second number. Denoting the first number as N and the second number as M, all three cases M>N, M=N, and M<N are covered. In the case of M>N, the number of output channels used for playback is greater than the number of input channels. An example of this scenario is a conversion from stereo to 5.1 surround. In the case of M=N, the same number of input and output channels is present. In this case, however, the content provided is redistributed among the individual channels. In the case of M<N, more input channels are available than playback channels. For example, 5.1 surround audio may be played back over two loudspeakers.

The audio classifier may be adapted to generate the gradually sliding control signals in a time-dependent manner. According to this embodiment, the control signals can be updated continuously or step-wise in response to possible changes in the character or properties of different parts of an audio excerpt under consideration during transmission of the audio data input signals. This time-dependent estimation of control signals allows a further refined control of the audio redistributor, which improves the quality of the processed and reproduced audio data. Furthermore, the system's behavior in general may be implemented to be time-dependent, such that it keeps on optimizing itself, for example based on day-to-day contents and/or metadata (like teletext).

The audio classifier may be adapted to generate the gradually sliding control signals frame by frame or block by block. Thus, different subsequent blocks or different subsequent frames of audio input data may be treated separately as regards the characterization of the type(s) of audio content they partially) relate to so as to refine the control of the audio redistributor.

Furthermore, the audio data processing device may comprise an adding unit, which is adapted to generate an input sum signal by adding the audio data input signals, and which is connected to provide the input sum signal to the audio classifier. The adding unit may simply add all audio input data from different audio data input channels to generate a signal with averaged audio properties so that a classification can be done on a statistically broader basis with low computational burden. Alternatively, each audio data input channel may be classified separately or jointly, resulting in high-resolution control signals.

The audio classifier may be adapted to generate the gradually sliding control signals in a gradually sliding dependence on the physical meaning of the audio data input signals. Particularly, different types of audio content may correspond to different audio genres.

According to these embodiments, physical meanings or psychoacoustic features of the audio data input signals can be taken into account. A pre-defined number of audio content types may be pre-selected. Based on those different audio content types (for example "music or speech" or "'pop' music, 'jazz' music, 'classical' music"), individual contributions of these types in an audio excerpt can be calculated so that, for example, the audio redistributor can be controlled on the basis of the information that a current audio excerpt has 60% "classical" music, 30% "jazz", and 10% "speech" contributions. For example, one of the following two exemplary types of classifications may be implemented, one type on a set of five general audio classes, and a second type on a set of popular music genres. The general audio classes are "classical" music, "popular" music (non-classical genre), "speech" (male and female, English, Dutch, German and French), "crowd noise" (applauding and cheering), and "noise" (background noises including traffic, fan, restaurant, nature). The popular music class may contain music from seven genres: "jazz", "folk", "electronic", "R&B", "rock", "reggae", and "vocal".

The physical meanings or natures may correspond to different types of audio content, particularly to different audio genres, to which the audio data input signals belong.

The audio classifier may be adapted to generate, as control signals, one or more probabilities which may have any (stepless) value in the range between zero and one, wherein each value reflects the probability that audio data input signals belong to a corresponding type of audio content. In contrast to the prior art, where only a 100% or 0% decision is taken (for example that the audio content is related to pure "classical" music), the system according to the invention is more accurate, since it distinguishes between different types of audio content (for example: "the present audio excerpt relates with a probability of 60% to "classical" music and with a probability of 40% to "jazz" music").

The audio classifier may be adapted to generate the audio data output signals based on a linear combination of these probabilities. If the audio classifier has determined that, for example, the audio content relates with a probability of p to a first genre and with a probability of 1−p to a second genre, then the audio redistributor is controlled by a linear combination of the first and the second genre, with the respective probabilities p and 1−p.

The audio classifier may be adapted to generate the gradually sliding control signals as a matrix, particularly as an active matrix. The elements of this matrix may depend on one or more probability values, which are estimated beforehand. The elements of the matrix may also depend directly on the audio data input signals. Each of the matrix elements can be adjusted or calculated separately to serve as a control signal for controlling the audio distributor.

The audio classifier may be a self-adaptive audio classifier, which is trained before use to distinguish different types of audio content in that it has been fed with reference audio data. According to this embodiment, the audio classifier is fed with sufficiently large amounts of reference audio signals (for example 100 hours of audio content from different genres) before the audio data processing device is put on the market. During this feeding with large amounts of audio data, the audio classifier learns how to distinguish different kinds of audio content, for example by detecting particular (spectral) features of audio data which are known (or turn out) to be characteristic of particular kinds of content types. This training process results in a number of coefficients being obtained, which coefficients may be used to accurately distinguish and determine, i.e. to classify, the audio content.

Additionally or alternatively, the audio classifier may be a self-adaptive audio classifier which is trained during use to distinguish different types of audio content through feeding with audio data input signals. This means that the audio data processed by the audio data processing device are used to further train the audio classifier also during practical use of this audio data processing device as a product, thus further refining its classification capability. Metadata (for example from teletext) may be used for this, for example, to support self-learning. When content is known to be movie content, accompanying multi-channel audio can be used to further train the classifier.

The audio redistributor, according to an embodiment of the audio data processing device, may comprise a first sub-unit and a second sub-unit. The first sub-unit may be adapted to generate, independently of control signals of the audio classifier, the first number of audio data intermediate signals based on a second number of audio data input signals. The second sub-unit may be adapted to generate, in dependence on control signals of the audio classifier, the first number of audio data output signals based on the first number of audio data intermediate signals. This configuration renders it possible to use an already existing first sub-unit, which is a conventional audio redistributor, in combination with a second sub-unit as a post-processing unit that takes into account the control signals for redistributing the audio data.

The audio data processing device according to the invention may be realized as an integrated circuit, particularly as a semiconductor integrated circuit. In particular, the system may be realized as a monolithic IC, which can be manufactured in silicon technology.

The audio data processing device according to the invention may be realized as a virtualizer or as a portable audio player or as a DVD player or as an MP3 player or as an internet radio device.

As an alternative to an audio classifier which generates control signals in dependence on types of audio content, wherein the audio data input signals are classified on the basis of an interpretation of audio signals following ad-hoc rules (which depend indirectly on the knowledge or experience of an engineer), the control signals for controlling an audio redistributor may also be generated fully automatically (without an interpretation or introduction of engineer knowledge) by introducing a system behavior which may be machine-learnt rather than designed by an engineer, which fully automatically analysis amounts in many parameters in the mapping from a sound feature to the probability that the audio belongs to a certain class. For this purpose, the audio classifier may be provided with some kind of auto-adaptive function (for example a neural network, a neuro-fuzzy machine, or the like) which may be trained in advance (for example for hundreds of hours) with reference audio music to allow the audio classifier to automatically find optimum parameters as a basis for control signals to control the audio redistributor. Parameters that may serve as a basis for the control signals, can be learnt from incoming audio data input signals, which audio data input signals may be provided to the system before and/or during use. Thus, the audio classifier may, by itself, derive analytical information based on which a classification of audio input data concerning its audio content may be carried out. For example, matrix coefficients for a conversion matrix to convert audio data input signals to audio data output signals may be trained in advance. As an example, DVDs often contain both stereo and 5.1 channel audio mixes. Although a perfect conversion from two to 5.1 channels will not exist in general, it is quite well defined when an algorithm is used to work in several frequency bands independently. Analyzing the two- and 5.1 channel audio mixes reveals these relations. These relations can then be learned automatically from the properties of the two-channel audio.

Thus, audio data input signals can be classified automatically without the necessity to include any interpretation step.

For example, such training can be done in advance in the lab before an audio data processing device is put on the market. This means that the final product may already have a trained audio classifier incorporating a number of parameters enabling the audio classifier to classify incoming audio data in an accurate manner. Alternatively or additionally, however, the parameters included in an audio classifier of an audio data processing device put on the market as a ready product can still be improved by being trained with audio data input signals during use.

Such training may include the analysis of a number of spectral features of audio data input signals, like spectral roughness/spectral flatness, i.e. the occurrence of ripples or the like. Thus features characteristic of different types of content may be found, and a current audio piece can be characterized on the basis of these features.

The above and further aspects of the invention will become apparent from the embodiments to be described hereinafter and are explained with reference to these embodiments.

BRIEF DESCRIPTION OF THE DRAWINGS

The invention will now be described in more detail with reference to examples of embodiments, but the invention is by no means limited thereto.

FIG. 1 shows an audio data processing device according to a first embodiment of the invention, FIG. 2A shows an audio data processing device according to a second embodiment of the invention, FIG. 2B shows a matrix-based calculation scheme for calculating audio data output signals based on audio data input signals and based on control signals, according to the second embodiment.

DESCRIPTION OF EMBODIMENTS

Figures 3A, 3B:
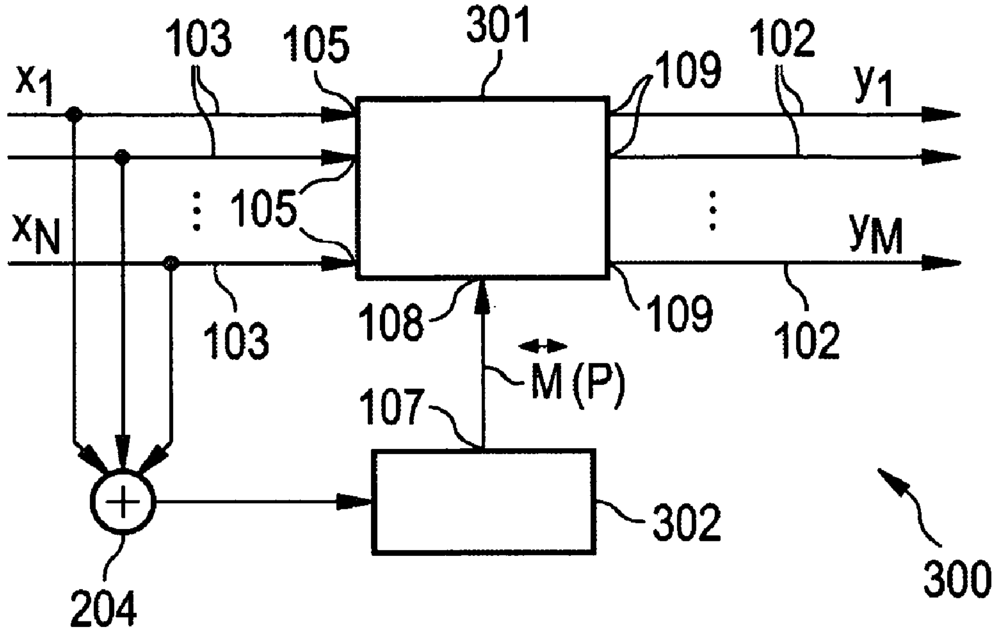
FIG. 3A shows an audio data processing device according to a third embodiment of the invention.
FIG. 3B shows a matrix-based calculation scheme for calculating audio data output signals based on audio data input signals and based on control signals, according to the third embodiment.

The illustration in the drawing is schematic. In different drawings, similar or identical elements are provided with the same reference signs.

In the following, referring to FIG. 1, an audio data processing device 100 according to a first embodiment of the invention will be described.

FIG. 1 shows an audio data processing device 100 comprising an audio redistributor 101 adapted to generate two audio data output signals based on six audio data input signals. The audio data input signals are provided at six audio data input channels 103 which are coupled to six data signal inputs 105 of the audio redistributor 101. Two data signal outputs 109 of the audio redistributor 101 are coupled with two audio data output channels 102 to provide their audio data output signals.

Furthermore, an audio classifier 104 is shown which is adapted to generate, in a gradually sliding dependence on types of audio content according to which the audio data input signals (supplied to the audio classifier 104 through six data signal inputs 106 coupled with the six audio data input channels 103) are classified, gradually sliding control signals P for controlling the audio redistributor 101 as regards the generation of the two audio data output signals from the six audio data input signals. Thus, the audio classifier 104 determines to what extent incoming audio input signals are to be classified as regards the different types of audio content.

The audio classifier 104 is adapted to generate the gradually sliding control signals P in a time-dependent manner, i.e. as a function P(t), wherein t is the time. When a sequence of frames (each constituted of blocks) of audio signals is applied to the system 100 at the audio data input channels 103, varying audio properties in the input data result in varying control signals p. Thus, the system 100 flexibly responds to changes in the type of audio content provided via the audio data input channels 103. In other words, different frames or blocks provided at the audio data input channels 103 are treated separately by the audio classifier 104 so that separate and time-dependent audio data classifying control signals P are generated to control the audio redistributor 101 to convert the audio signals provided at the six input channels 103 into audio signals at the two output channels 102. The audio classifier 104 is adapted to generate the gradually sliding control signals P in a gradually sliding dependence on different types of audio content (for example physical/psychoacoustic meanings) of the audio data input signals. In other words, a set of discrimination rules for distinguishing between different types of audio content, particularly different audio genres, are pre-stored within the audio classifier 104. Based on these discrimination rules (ad-hoc rules or expert rules), the audio classifier 104 estimates to what extent the audio data input signals belong to each of the different genres of audio content.

In the following, referring to FIG. 2A, an audio data processing device 200 according to a second embodiment of the invention will be described.

The audio data processing device 200 comprises an audio redistributor 201 for converting N audio data input signals $x_1, \ldots, x_N$ into M audio data output signals $z_1, \ldots z_M$. The audio redistributor 201 comprises an N-to-M redistributing unit 202 and a post-processing unit 203. The N-to-M redistributing unit 202 is adapted to generate, independently of control signals of an audio classifier 104, M audio data intermediate signals $y_1, \ldots, y_M$ based on the N audio data input signals $x_1, \ldots, x_N$. The post-processing unit 203 is adapted to generate M audio data output signals $z_1, \ldots, z_M$ from the intermediate signals $y_1, \ldots, y_M$ in dependence on control signals P generated by the audio classifier 104 based on an analysis of the audio data input signals $x_1, \ldots, x_N$.

The audio data processing device 200 comprises an adding unit 204 adapted to generate an input sum signal by adding the audio data input signals $x_1, \ldots, x_N$ together so as to provide the input sum signal for the audio classifier 104.

The implementation shown in FIG. 2A, FIG. 2B makes use of an existing redistribution system 202 which is upgraded with a classifier 104 and a post-processing unit 203, which post-processing unit 203 can be controlled by the results of calculations carried out in the classifier 104. Thus, the audio data processing device 200 serves to upgrade an existing redistribution system 202.

The block "N-to-M" 202 is an existing redistribution system, for example Dolby Pro Logic II™ (in this case N=2 and M=6). The N input channels are added by the adding unit 204 and fed to the audio classifier 104, which audio classifier 104 is trained to distinguish between the desired classes of audio content. The output of the classifier 104 are probabilities P that the audio data input signals $x_1, \ldots, x_N$ belong to a certain class of audio content. These probabilities are used to trim the "M-to-M" block 203, which is a post-processing block.

An interesting application of this scenario could be the following: Dolby Pro Logic II™ has two different modes, namely Movie and Music, which have different settings and are manually chosen. One major difference is the width of the center image. In the Movie mode, (audio) sources panned in the center are fed fully to the center loudspeaker. In the Music mode, the center signal is also fed to the left and right loudspeaker to widen the stereo image. This, however, has to be changed manually. This is not convenient for a user when she or he, for example, is watching television and she or he is switching from a music channel like MTV to a news channel like CNN. Thus, in a scenario in which movies contain music parts, manual selection of movie/music modes is not optimal. The music videos on MTV would require a Music mode, but the speech on CNN would require a Movie setting. The invention when applied in this scenario will automatically tune the setting.

Thus, FIG. 2A shows a block diagram of the upgrading of an existing redistribution system 202 with an audio classifier 104.

The implementation of the invention with a conventional N-to-M redistributing unit 202 is performed as follows in the described embodiment:

The N-to-M block 202 contains a Dolby Pro Logic II™ decoder in Movie mode. The classifier 104 contains two classes, namely Music and Movie. The parameter P is the probability that the input audio $x_1, \ldots, x_N$ is music (P is continuously variable over the entire range [0; 1]).

The N-to-M block 203 can now be implemented to carry out the function shown in FIG. 2B.

In FIG. 2B, $L_f$ is the left front signal, $R_f$ is the right front signal, C is the center signal, $L_s$ is the left surround signal, $R_s$ is the right surround signal and LFE is the low-frequency effect signal (subwoofer). The parameter a is a constant having, for example, a value of 0.5. The parameter a defines the center source width in the music mode.

The parameter P is determined in frames, so it changes over time. When the content of the audio changes over time, the playback of the center signal changes, depending on P. Thus, the audio classifier 104 is adapted to generate the gradually sliding control signals, particularly parameter P, in a time-dependent manner. Furthermore, the audio classifier 104 is adapted to generate the gradually sliding control signals frame by frame or block by block. The audio classifier is thus adapted to generate as its control signal the probability P, which probability P may have any value in the range between zero and one, reflecting the likelihood of the audio data input signals belonging to Music and the likelihood 1−P of the audio data input signals belonging to the Movie class.

As is further evident from FIG. 2B, the audio classifier 104 is adapted to generate audio data output signals based on a linear combination of the probabilities P and 1−P.

In the following, referring to FIG. 3A and FIG. 3B, an audio data processing device 300 according to a third embodiment of the invention will be described.

The audio data processing device 300 has the redistributing unit 202 and the post-processing unit 203 integrated into one building block, namely an N-to-M redistributor 301. Thus, the audio data processing device 300 integrates redistribution and classification.

The N-to-M redistributor 301 can be implemented as follows. The M output channels 102 are linear combinations of the N input channels 103. The parameters in the matrix $\tilde{\mathbf{M}}(P)$ are a function of the probabilities P that come out of the classifier 302. This can be implemented in frames (that is blocks of signal samples), since the probabilities P are also determined in frames in the described embodiment.

A practical application of the system shown in FIG. 3A is a stereo to 5.1-surround conversion system. High-quality results are obtained when such a system is applied, since audio-mixing is content-dependent. For example, speech is panned to a center speaker. Vocals are panned to center and divided over left and right. Applause is panned to rear speakers. This conversion of input signals $x_1, \ldots, x_N$ into output signals $y_1, \ldots, y_M$ is carried out on the basis of the conversion matrix $\tilde{\mathbf{M}}(P)$, which in its turn depends on the probabilities P.

In the following, referring to FIG. 4A and FIG. 4B, an audio data processing device 400 according to a fourth embodiment will be described.

Figures 4A, 4B:
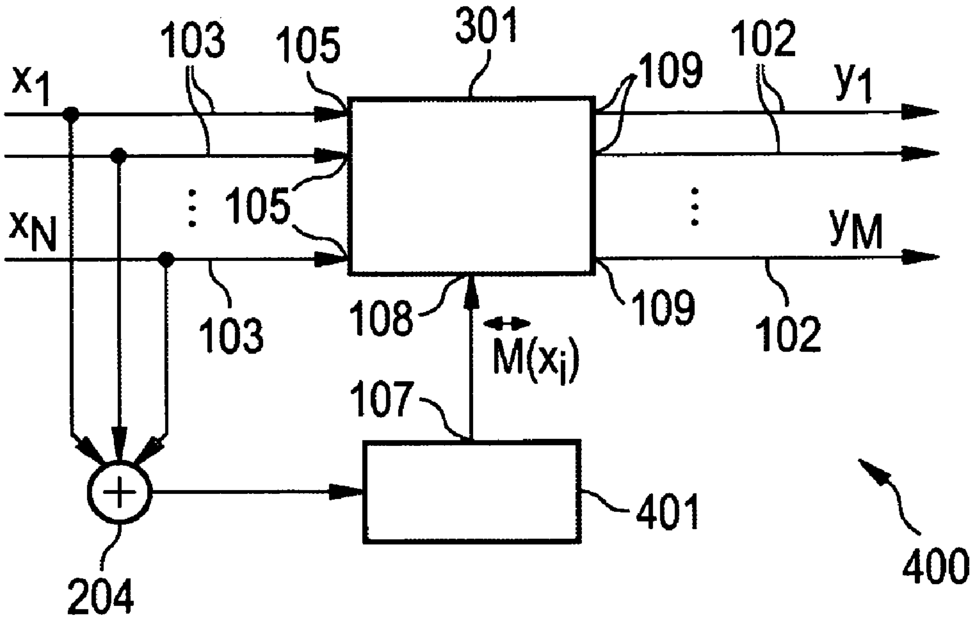
FIG. 4A shows an audio data processing device according to a fourth embodiment.
FIG. 4B shows a matrix-based calculation scheme for calculating audio data output signals based on audio data input signals and based on control signals, according to the fourth embodiment.

FIG. 4A, FIG. 4B show a configuration in which a matrix $\tilde{\mathbf{M}}(x_i)$ generated by an audio classifier 401 serves a source of control signals for the N-to-M redistributor 301. Thus, in the case of the audio data processing device 400, the elements of the matrix $\tilde{\mathbf{M}}(x_i)$ depend on the audio data input signals $x_i$ with i=1, . . . , N, so $x_1, \ldots, x_N$. Therefore, no probabilities P (used as a basis for a subsequent calculation of matrix elements) have to be calculated in the fourth embodiment. Instead, the audio classifier 401 according to the fourth embodiment is implemented as a self-adaptive audio classifier 401 which has been pre-trained to derive elements of the conversion matrix $\tilde{\mathbf{M}}(x_i)$ automatically and directly from the audio data input signals $x_i$. Thus, audio features may be derived from the audio data input signals $x_i$. Then, a mapping function may be learned, which provides the active matrix coefficients as a (learned) function of these features. In other words, according to the fourth embodiment, the elements of the active conversion matrix depend directly on the input signals instead of being generated on the basis of separately determined probability values P.

It should be noted that the term "comprising" does not exclude elements or steps other than those specified and the word "a" or "an" does not exclude a plurality. Also, elements described in association with different embodiments may be combined. It should also be noted that reference signs in the claims shall not be construed as limiting the scope of the claims.

The invention claimed is:

1. An audio data processing device, comprising an audio redistributor for generating a first number of audio data output signals ($z_1 \ldots z_M$) to be output on a first number of output channels based on, and in response to, a second number of audio data input signals ($x_1 \ldots x_N$) received on a second number of input channels; and an audio classifier, responsive to the second number of audio data input signals, for generating gradually sliding control signals (P), in a gradually sliding dependence on types of audio content according to which the second number of audio data input signals ($x_1 \ldots x_N$) are classified, wherein the audio redistributor further generates the first number of audio data output signals ($z_1 \ldots z_M$) from the second number of audio data input signals ($x_1 \ldots x_N$) in response to the gradually sliding control signals.

2. The audio data processing device according to claim 1, wherein the audio classifier is a self-adaptive audio classifier which is trained before use to distinguish different types of audio content in that the audio classifier is fed beforehand with reference audio data.

3. The audio data processing device according to claim 1, wherein the audio classifier is a self-adaptive audio classifier which is trained during use to distinguish different types of audio content through feeding of the audio classifier with audio data input signals.

4. The audio data processing device according to claim 1, wherein the first number and/or the second number is greater than one.

5. The audio data processing device according to claim 1, wherein the first number is greater than the second number.

6. The audio data processing device according to claim 1, wherein the audio classifier is adapted to generate the gradually sliding control signals (P) in a time-dependent manner.

7. The audio data processing device according to claim 1, wherein the audio classifier is adapted to generate the gradually sliding control signals (P) frame by frame or block by block.

8. The audio data processing device according to claim 1, wherein the audio classifier is adapted to generate the gradually sliding control signals (P) in a gradually sliding dependence on the physical meaning of the audio data input signals ($x_1 \ldots x_N$).

9. The audio data processing device according to claim 1, wherein different types of audio content correspond to different audio genres.

10. The audio data processing device according to claim 1, wherein the audio classifier is adapted to generate as the control signals (P) one or more probabilities, which may have any value in the range between zero and one, wherein each probability reflects a likelihood that audio data input signals ($x_1 \ldots x_N$) belong to a corresponding type of audio content.

11. The audio data processing device according to claim 10, wherein the audio redistributor is adapted to generate the audio data output signals ($z_1 \ldots z_M$) on the basis of a linear combination of the probabilities.

12. The audio data processing device according to claim 1, wherein the audio classifier is adapted to generate as the control signals (P) one or more probabilities, which may have any value in the range between zero and one, wherein each probability reflects a likelihood that audio data input signals ($x_1 \ldots x_N$ belong to a corresponding type of audio content, and wherein the audio classifier is adapted to generate the gradually sliding control signals (P) in the form of an active matrix.

13. The audio data processing device according to claim 10, wherein elements of the matrix depend on the one or more probabilities.

14. The audio data processing device according to claim 12, wherein elements of the matrix depend on the audio data input signals ($x_1 \ldots x_N$).

15. The audio data processing device according to claim 1, wherein the audio redistributor comprises a first sub-unit and a second sub-unit, wherein the first sub-unit is adapted to generate a first number of audio data intermediate signals ($y_1 \ldots y_M$) based on the second number of audio data input signals ($x_1 \ldots x_N$) independently of control signals (P) of the audio classifier; and wherein the second sub-unit is adapted to generate the first number of audio data output signals ($z_1 \ldots x_N$) based on the first number of audio data intermediate signals ($y_1 \ldots y_M$) in dependence on the control signals (P) of the audio classifier.

16. The audio data processing device according to claim 1, realized as an integrated circuit.

17. The audio data processing device according to claim 1, realized as a virtualizer or as a portable audio player or as a DVD player or as an MP3 player or as an internet radio device.

18. A method of processing audio data, the method comprising the steps of:

redistributing audio data input signals by generating a first number of audio data output signals ($z_1 \ldots z_M$) to be output on a first number of output channels based on, and in response to, a second number of audio data input signals ($x_1 \ldots x_N$) received on a second number of input channels; and classifying the audio data input signals, responsive to the second number of audio data input signals, so as to generate gradually sliding control signals (P), in a gradually sliding dependence on types of audio content according to which the audio data input signals are classified, wherein the redistribution is further for generating the first number of audio data output signals ($z_1 \ldots z_M$) from the second number of audio data input signals ($x_1 \ldots x_N$) in response to the gradually sliding control signals.

19. A program element which, when executed by a processor, is adapted to carry out a method of processing audio data, the method comprising the steps of:

redistributing audio data input signals by generating a first number of audio data output signals ($z_1 \ldots z_M$) to be output on a first number of output channels based on, and in response to, a second number of audio data input signals ($x_1 \ldots x_N$) received on a second number of input channels; and classifying the audio data input signals, responsive to the second number of audio data input signals, so as to generate gradually sliding control signals (P), in a gradually sliding dependence on types of audio content according to which the audio data input signals are classified, wherein the redistribution is further for generating the first number of audio data output signals ($z_1 \ldots z_M$) from the second number of audio data input signals ($x_1 \ldots x_N$) in response to the gradually sliding control signals.

20. A computer-readable medium, in which a computer program is stored which, when executed by a processor, is adapted to carry out a method of processing audio data, the method comprising the steps of:

redistributing audio data input signals by generating a first number of audio data output signals ($z_1 \ldots z_M$) to be output on a first number of output channels based on, and in response to, a second number of audio data input signals ($x_1 \ldots x_N$) received on a second number of input channels; and classifying the audio data input signals, responsive to the second number of audio data input signals, so as to generate gradually sliding control signals (P), in a gradually sliding dependence on types of audio content according to which the audio data input signals are classified, wherein the redistribution is further for generating the first number of audio data output signals ($z_1 \ldots z_M$) from the second number of audio data input signals ($x_1 \ldots x_N$) in response to the gradually sliding control signals.

* * * * *